United States Patent Office 3,023,329
Patented Feb. 27, 1962

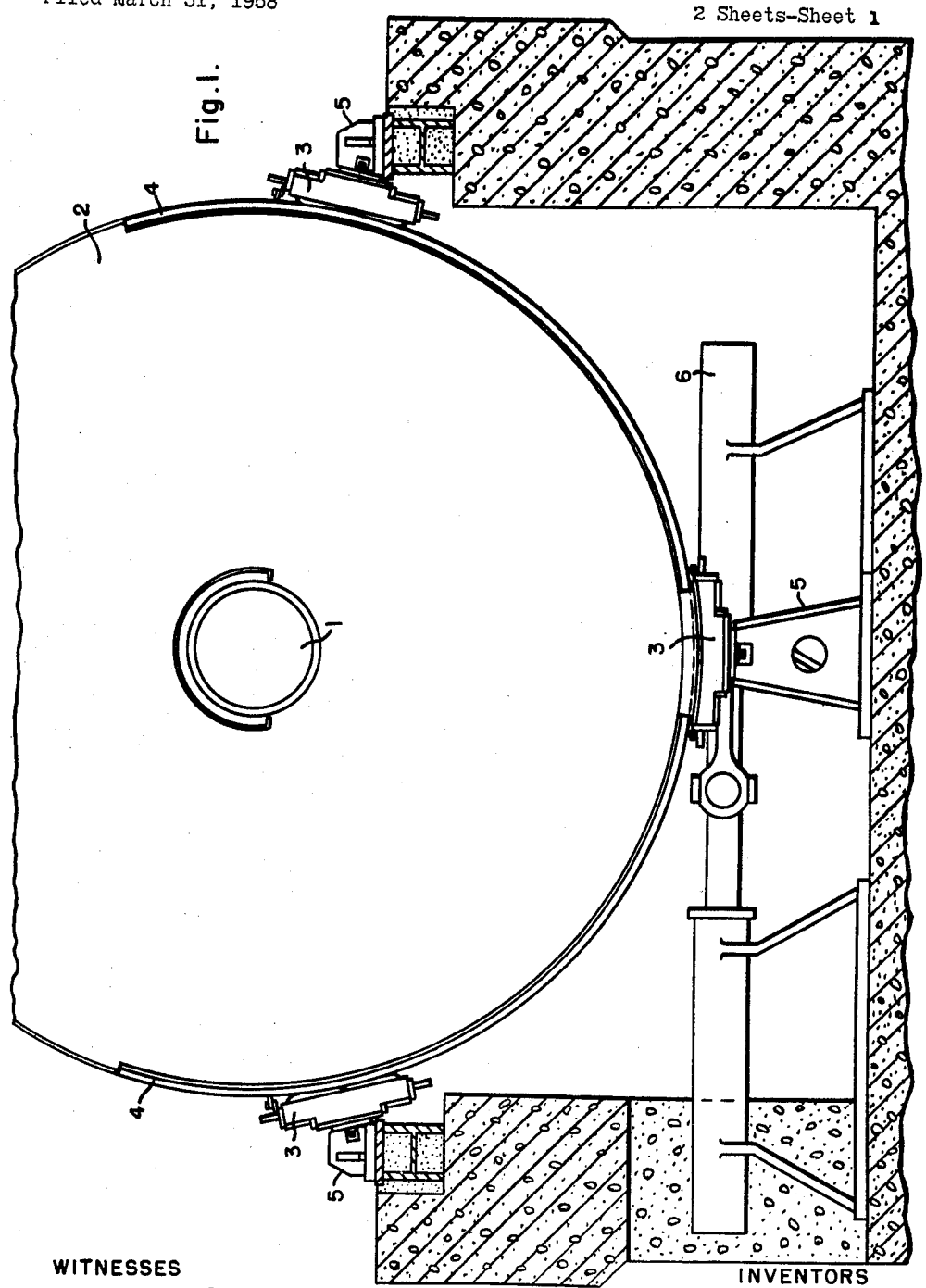

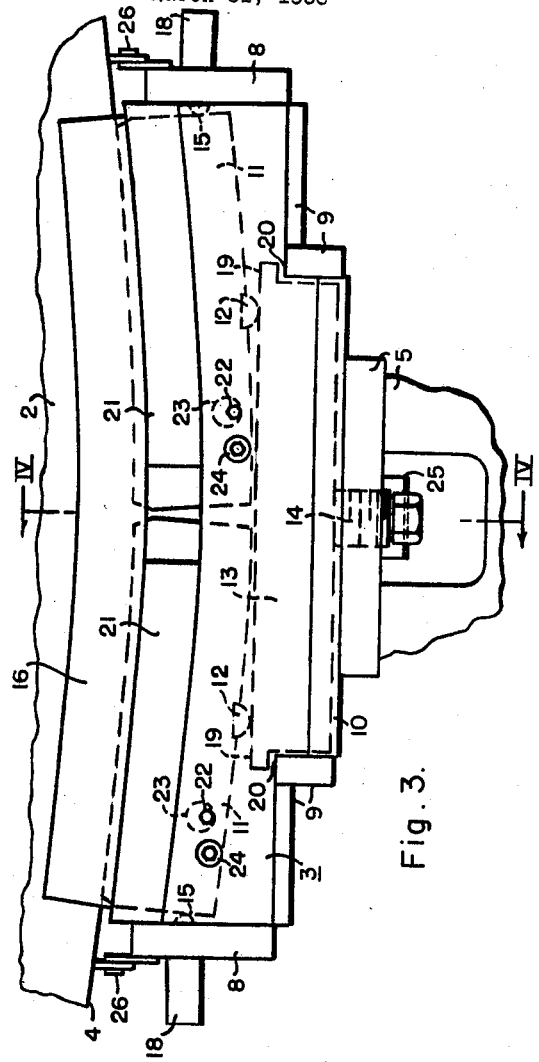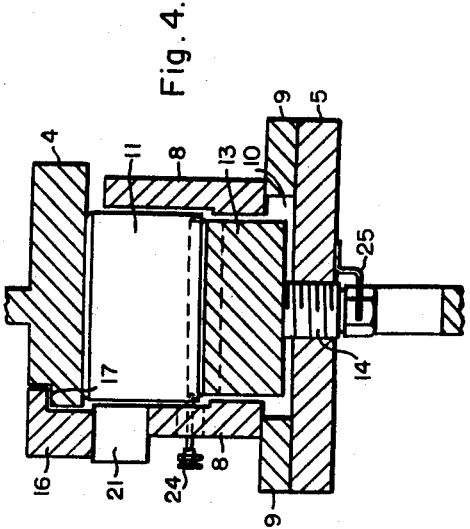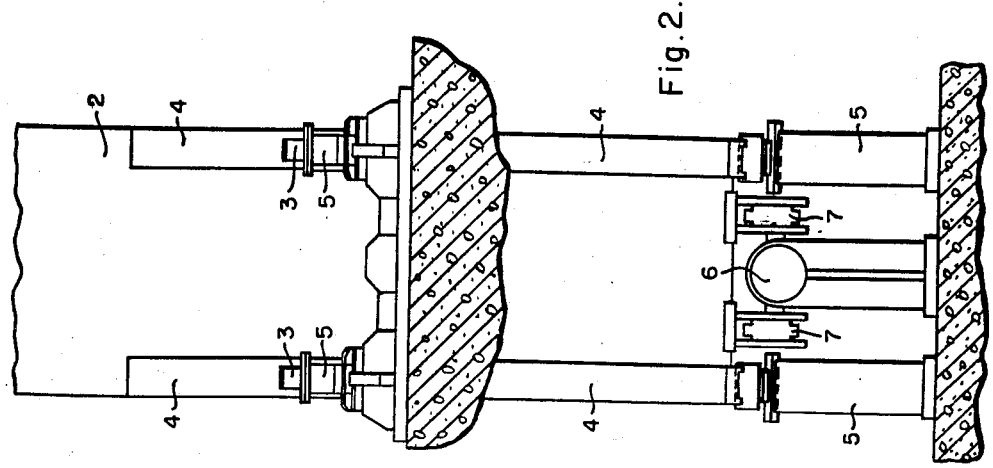

3,023,329
DYNAMOELECTRIC MACHINE
Paul L. Kamphaus, Allison Park, and Albert W. Latham, Wilkins Township, Allegheny County, Pa., assignors to Westinghouse Electric Corporation, East Pittsburgh, Pa., a corporation of Pennsylvania
Filed Mar. 31, 1958, Ser. No. 725,345
6 Claims. (Cl. 310—91)

The present invention relates to a dynamoelectric machine of the type requiring provision for frame rotation, and more particularly relates to a support means for dynamoelectric machines of that type.

In some types of dynamoelectric machines, such as frequency converters, it is necessary to make provisions for rotating the frame of the machine with respect to its foundation. When two or more frequency changers are operated in parallel, it is common practice to design the stator members so that they can be rotated through a limited angle by means of a frame shifting device. Means for shifting the stator must be provided to obtain the proper angular phase position of each frequency changer because of the unavoidable slight variations in manufacturing duplicate designs, and because of the varying reactance of the connections between frequency converters operating in parallel. By this means the system load can be divided equally among the frequency changers with resultant greater flexibility. While our invention is illustrated as being embodied in a frequency changer, it is to be understood that the support assembly described can be used with any dynamoelectric machine where it is desirable to provide for rotation of the stator member with respect to its foundation.

Frame shifter devices for rotation of the frame must include some means for supporting the dynamoelectric machine. Such a means must support the frame while allowing rotation of the same. In many such machines he support means consists of a single large brass lined cradle. Of course, with one large cradle any extraneous high spots on the cradle support surface will tend to support the entire weight of the machine. Therefore, the forming of this type of cradle to receive the machine frame requires difficult and expensive scraping and fitting to eliminate high spots and even this, at best, is only partially successful. Sometimes the insertion of shims underneath the cradle is necessary for properly positioning the cradle under the frame. The conventional cradle furnishes no means for uniformly distributing the weight of the stator of the dynamoelectric machine over the entire surface of the cradle. As a result a much larger cradle is required than is actually necessary to support the weight of the machine. Vibrations set up within the machine are easily transmitted to the foundation through this cradle and the severity of the mechanical forces developed by the machine under short-circuit conditions puts a tremendous strain upon such a cradle and its foundation. Thus, it is seen that many difficulties and problems have been present in conventional supporting means for dynamoelectric machines of the type requiring frame rotation.

The principal object of our invention is to provide a support means permitting angular rotation of the frame of a dynamoelectric machine.

Another object of our invention is to supply a support means allowing a better distribution of the weight to be supported and having a greater ability to withstand short-circuit forces.

Another object of our invention is a support means requiring no shims, and allowing easy handling and installation as well as permitting replacement of parts with a minimum of down time.

Other objects and advantages of our invention will be apparent from the following detailed description, taken in connection with the accompanying drawings, in which:

FIGURE 1 is a vertical elevation end view of an illustrative embodiment of our invention used with a large frequency changer;

FIG. 2 is a vertical elevation side view of the illustrative embodiment of our invention;

FIG. 3 is a side elevation on a somewhat enlarged scale of a bearing box utilized in the embodiment in FIG. 1 and a fragmentary view of the frequency changer and mounting stand in relation therewith; and FIG. 4 is a cross-sectional view taken along the line IV—IV as indicated by the arrows in FIG. 3.

The dynamoelectric machine, herein shown as a frequency changer for purposes of illustration, has a rotatable member 1 supported for rotation in any suitable manner by the frame or stator member 2. The rotor and stator members 1 and 2 may be of any suitable construction and have not been shown in detail since their construction is not a part of the invention. The stator member 2 is, in turn, supported in a foundation pit by bearing boxes 3 located circumferentially about the stator member 2 and mounted on support stands 5. Three such bearing boxes 3 are shown positioned at each end of the stator member 2 and supporting the stator member 2 by engaging a bearing runner or rail 4 which is concentric and integral with the stator member 2 at each end thereof. Each bearing box 3 is supported on a support stand 5 which, in turn, is grouted to the foundation or otherwise rigidly supported. The stator member 2 is supported and positioned by the bearing boxes 3 at each end of the stator member 2. The bearing boxes 3 engage the rails 4 so that the stator member 2 is capable of free rotation. A frame shifter piston 6, hydraulically operated or otherwise, engages a dog 7 located at the bottom of the stator member 2. The frame shifter piston 6 exerts a tangential force tending to rotate or shift the stator member 2 in either a clockwise or counterclockwise direction as may be desired.

FIGS. 3 and 4 show a somewhat enlarged view of a bearing box 3 engaging and supporting the frequency changer and making support contact therewith through the stator rail 4. The bearing box 3 is a generally rectangular shaped box with side walls 8 and a bottom member 9 with a large opening 10 therethrough. The bottom member 9 is bolted to support stand 5 for support of the entire machine.

The bearing box 3 illustrated contains two freely pivoting bearing segments 11 with a bearing surface of any suitable type, such as babbit, engaging the stator rail 4. A support member 12 with a rounded bottom surface is keyed into each bearing segment 11 at the bottom center of the segment 11 so as to provide substantially a line contact between each segment 11 and a resilient member or leaf spring 13. As illustrated, a line contact is made at each end of the leaf spring 13 by the bearing segments 11. The leaf spring 13, in turn, is pivotally mounted on a fulcrum or jackscrew 14 located at a point equidistant from the line supports furnished by the supporting member 12 of each segment 11. The jackscrew 14 is threaded through the support stand 5 and protrudes through the opening 10 in the bottom member 9 of the bearing box 3. As stated previously, the jackscrew 14 engages and supports the leaf spring 13 at a point equidistant from the line supports. The leaf spring 13 is thereby freely tilting about the fulcrum or jackscrew 14.

As stated previously, it is most desirable to distribute the weight and short-circuit forces which may occasionally occur over the entire contact surface of the supporting means. In accordance with the present invention, since each segment 11 is freely pivoting about its own line contact support, the weight of the dynamoelectric machine is evenly distributed over the bearing surface of the segments 11. The necessary supporting forces are balanced about each line contact, and the line contacts, in turn, are supported at each end of the flexible member or leaf spring 13. The leaf spring 13 is freely tilting about the jackscrew 14 and furnishes a further means for balancing and equalizing the weight of the dynamoelectric machine over the entire bearing assembly. In a like manner the forces present under short-circuit conditions of the frequency changer are evenly distributed in lever-like action about the line supports and fulcrum point.

A rivet 15 at each end of the bearing box 3 furnishes a point contact for positioning the bearing segments 11 within the bearing box 3 so that rotation of the stator member 2 will not cause the bearing segments 11 to shift with the rotation of the stator member 2. Wipers 26 are mounted on each side of the bearing box 3 to engage the rail 4 and precede the bearing segments 11 in either direction of rotation thereby insuring a rail surface free from foreign substances which might interfere with the proper supporting and sliding action between the rails 4 and the bearing segments 11, or which might damage the bearing surfaces.

In order to insure a minimum of movement of the stator member 2, particularly when subjected to short-circuit conditions, one or all of the bearing boxes 3 on each end of the stator member 2 can be provided with an interengaging means to limit axial and radial movement of the frequency changer stator 2. That is, the bearing box housing as seen in FIG. 4, left-hand side, can be made to have a retaining member 16 extending over a portion of the bearing segments 11 contained within the bearing box 3. This retaining member 16 fastened to a mounting piece 21 and hence to the sidewall 8 engages a recess 17 on the underside of each of the rails 4 on the side adjacent its corresponding end of the stator member 2. If the interengaging means is not desired on a particular bearing box, then both side members 8 will be as shown in FIG. 4, right-hand side.

It should be noted that the bearing box 3 lends itself very readily to handling, installing or removing. Lifting lugs 18 are provided on each end of the bearing box 3 thereby furnishing means for handling. The freely pivoting bearing segments 11 and the leaf spring 13 are retained within the bearing box 3 when removed from its mounting. A shoulder 19 on each end of the leaf spring 13 is supported by an edge 20 of the opening 10 in the bottom member 9 of the bearing box 3. In such a manner, the leaf spring 13 is held in position within the box 3 when the box is removed from its support stand 5 and away from the fulcrum or jackscrew 14. A pin not shown, can be inserted through a pinhole 22 at each side of the bearing box 3, which pin will project into an opening 23 in the bearing segments 11 thereby locking the freely pivoting bearing segments 11 into place within the bearing box 3 when not in service. In this way the freely pivoting bearing segments 11 and the leaf spring 13 are retained within the bearing box 3 when the box is removed from its mounting. A small lubricating fitting 24 may be provided projecting from the bearing box housing at each side thereof, furnishing means for lubricating the moving parts within the bearing box 3.

When installing a bearing box 3, the pins can be removed from the openings 23 after the bearing box 3 has been properly mounted in its supporting stand 5. The jackscrew 14 is then advanced out of the support stand 5 so as to engage the leaf spring 13 and lift the leaf spring 13 and the bearing segments 11 up to engagement with the rail 4 on the rotating member 2. It can be readily seen that no shims are necessary to insure a proper engagement and support of the stator member 2 since the freely pivoting bearing segments 11 and the freely tilting leaf spring 13 will self-adjust in lever-like action to distribute the supporting forces necessary to hold the stator member 2 in position. Once the jackscrew 14 has been properly positioned, a lock plate 25 will insure no backing off of the jackscrew 14 and no tampering by unauthorized personnel.

It is now apparent that our invention has provided a simple and inexpensive manner of mounting and supporting a frequency changer for angular rotation of the stator member 2. The expensive and difficult scraping heretofore required for the exacting fit between the stator member and a large support cradle has been eliminated. The jackscrew fulcrum plus the pivotal mounting of the bearing segments themselves about line contacts on a resilient means not only allows the weight of the frequency changer to be equalized over the entire bearing surface, but also allows adjustment in the positioning of the frame. This eliminates the cumbersome method of inserting shims into the support assembly to attain proper alignment and positioning of the stator member 2 with respect to the supporting means. The spring mounting, in a freely tilting manner, reduces the vibration transmitted from the frequency changer to the foundation and also tends to minimize the severity of foundation reaction forces when the frequency changer is subjected to short-circuit conditions.

It is to be understood that our invention is not to be limited to the described configuration alone, but that all equivalents and modifications are included within the spirit and scope of our invention. It is obvious that a plurality of bearing boxes circumferentially placed about the stator member 2 and any desired number of bearing segments 11 within a given bearing box 3 could be used. The freely pivoting segments 11 mounted on a resilient means, which is, in turn, freely tilting allows many modifications within the scope of our invention.

We claim as our invention:

1. In a dynamoelectric machine having a stator member and a plurality of rails on said stator member concentric therewith; a plurality of bearing boxes spaced circumferentially within an arc subtended by less than 180° about the stator member, each bearing box comprising a plurality of pivotally mounted segments engaging one of said rails, resilient means for supporting said segments, and a fulcrum member for supporting said resilient means at substantially the center thereof.

2. In a dynamoelectric machine having a stator member, a rail on said stator member concentric therewith on one end of said stator and another rail concentric therewith on the other end of said stator; a plurality of bearing boxes spaced circumferentially about the lower half of said stator, each bearing box comprising a plurality of pivotally mounted segments engaging one of said rails to support the stator member, resilient means for supporting said segments, and an adjustable fulcrum member for supporting said resilient means at substantially the center thereof.

3. In combination, a dynamoelectric machine having a stator member, a rail on said stator member concentric therewith on one end of said stator and another rail concentric therewith on the other end of said stator, a recess in each of said rails on the side adjacent the corresponding end of the stator, a plurality of bearing boxes spaced circumferentially about the lower half of said stator, each bearing box comprising a plurality of pivotally mounted segments engaging one of said rails to support the stator member, each of said bearing boxes having a resilient means for supporting and balancing said segments about a fulcrum, and a retaining member on at least one of said bearing boxes engaging in said recess.

4. In combination, a dynamoelectric machine having a stator member, a rail on said stator member concentric therewith on one end of said stator and another rail concentric therewith on the other end of said stator, a recess in each of said rails on the side adjacent the corresponding end of the stator, three bearing boxes spaced circumferentially about the lower half of each end of said stator, each bearing box comprising a first pivotally mounted segment and a second pivotally mounted segment engaging one of said rails to support the stator member, each of said bearing boxes having a leaf spring for supporting said first segment at one end and said second segment at the other end of said spring, a jackscrew equidistant from the center of each segment pivotally supporting said spring in a freely tilting manner, at least one of the bearing boxes at each end of said stator having a projection engaging said recess.

5. A bearing assembly comprising two bearing segments adapted to engage and support the frame of a dynamoelectric machine, a line supporting member under the center of each segment providing a pivotal mount therefor, a leaf spring supporting at each of its ends a line supporting member, and a jackscrew at the center of said spring and midway between the line contacts providing a fulcrum support for said spring.

6. A bearing assembly comprising a leaf spring and bearing segments, said bearing segments pivotally mounted upon said leaf spring, said leaf spring in turn fulcrum mounted in such a manner as to balance the weight and forces on each bearing segment.

References Cited in the file of this patent

UNITED STATES PATENTS

| | | |
|---|---|---|
| 2,447,605 | Treshow | Aug. 24, 1948 |
| 2,469,662 | Minchin | May 10, 1949 |
| 2,592,229 | Alexay | Apr. 8, 1952 |
| 2,606,081 | Moller | Aug. 5, 1952 |
| 2,629,063 | Ellis | Feb. 17, 1953 |